United States Patent
Badalucco et al.

(10) Patent No.: US 7,023,836 B2
(45) Date of Patent: Apr. 4, 2006

(54) TRANSPORT INTERFACE FOR TIME DIVISION FRAMES

(75) Inventors: Giuseppe Badalucco, Lissone (IT); Gilberto Loprieno, Milan (IT)

(73) Assignee: Alcatel, Paris (FR)

( * ) Notice: Subject to any disclaimer, the term of this patent is extended or adjusted under 35 U.S.C. 154(b) by 966 days.

(21) Appl. No.: 09/910,811

(22) Filed: Jul. 24, 2001

(65) Prior Publication Data

US 2002/0015414 A1 Feb. 7, 2002

(30) Foreign Application Priority Data

Jul. 31, 2000 (IT) .......................... TO2000A0760

(51) Int. Cl.
*H04L 12/28* (2006.01)

(52) U.S. Cl. ...................... 370/351; 370/391; 370/360; 370/395.1; 370/412; 370/465

(58) Field of Classification Search ................ 370/466, 370/465, 419, 412, 395.51, 395.52, 395.6, 370/395.1, 362, 360, 394, 392, 354, 353, 370/352, 351
See application file for complete search history.

(56) References Cited

U.S. PATENT DOCUMENTS

| 5,859,846 A | * | 1/1999 | Kim et al. ............. 370/395.62 |
| 6,414,966 B1 | * | 7/2002 | Kulkarni et al. ............ 370/465 |
| 6,778,529 B1 | * | 8/2004 | Field et al. ................. 370/353 |

* cited by examiner

*Primary Examiner*—Wellington Chin
*Assistant Examiner*—Raj Jain
(74) *Attorney, Agent, or Firm*—Sughrue Mion, PLLC

(57) ABSTRACT

A transport interface for time division frames, in particular SDH frames transmitted between telecommunications network nodes according to a specified transport protocol, said nodes comprising first circuit means (SM) for processing said time division frames (TRM, TRM2) according to said specified transport protocol, and second circuit means (FP) apt to exchange second information streams (FDS) with said first circuit means (SM) through said transport interface (STI). According to the invention, said second information streams (FDS), exchanged by the transport interface (STI) with the first circuit means (SM) and with the second circuit means (FP), are simplified with respect to said time division frames (TRM1, TRM2) received from said node, in particular are composed by a data stream (BD, T_BD, R_BD) sent in a co-directional way and by an address information (EAR, T_EAR, R_EAR) sent by the transport interface (STI).

11 Claims, 2 Drawing Sheets

TRANSPORT INTERFACE FOR TIME DIVISION FRAMES

INCORPORATION BY REFERENCE OF PRIORITY DOCUMENT

This application is based on and claims the benefit of Italian Patent Application No. TO 2000A 000 760, filed Jul. 31, 2000, which is incorporated by reference herein.

BACKGROUND OF THE INVENTION

1. Field Of The Invention

The present invention relates to a transport interface for time division frames, in particular SDH frames, and related interfacing method of time division frames.

2. Description Of The Prior Art

In modern digital communication systems, the various information streams, or data, propagating on telecommunication networks are multiplexed in frames according to predetermined transport protocols, such as SDH (Synchronous Digital Hierarchy) transport protocol for time division frames. This transport protocol is particularly suitable for conveying and distributing the numerous information streams among the various telecommunications network nodes.

Therefore, various logic circuits are arranged inside the telecommunications network nodes, such as SDH network, apt to process in different ways the time division frame received from the node. These operations are essentially related to dealing with the synchronism and with the extraction of the various data streams multiplexed inside the time division frame, as well as with the subsequent processing of the various information streams extracted from said time division frames.

Therefore, in order to process the SDH time division frame, an ASIC (Application Specific Integrated Circuit) circuit, i.e. a dedicated circuit is developed, which performs SDH operations on the frame by extracting and inserting the information streams, also called tributaries, from the so called Virtual Containers, wherein they are multiplexed. This ASIC circuit can be followed by FPGA (Field Programmable Gate Arrays) circuits, i.e. circuits adaptable according to their utilization and located outside the ASIC circuit, which process the tributaries extracted from the frame, such as processing the streams that use ATM (Asynchronous Transfer Mode) protocol or IP (Internet Protocol) protocol, previously multiplexed inside the SDH frame. Due to their flexibility, FPGA circuits are frequently employed in conjunction with dedicated circuits.

Communications between ASIC circuits and related FPGA circuits are usually defined as 'intra-equipment' communications, namely communications occurring inside the telecommunications network node, whereas communications between the nodes are called line communications. The same interface protocols employed for the nodes receiver interfaces are also used for the above intraequipment communications of tributaries, such as the so called Network Node Interfaces, i.e. network node interfaces for line communications to other nodes.

This causes some drawbacks, since the tributaries are sent to FPGA devices under a very complex structure defined by SDH protocol, which is redundant compared with the needs, and requires the use of complex interfaces between the FPGA devices and ASIC circuit.

Moreover, the interfaces of the ASIC circuit are not flexible, since they have to operate on different protocols, i.e. ATM or IP, which are not structure compatible. For instance, an ASIC circuit can communicate with a certain number of FPGA devices performing certain termination functions, e.g. operating according to ATM protocol, but cannot communicate with FPGA devices using IP protocol, unless they have further transport interfaces expressly provided for handling IP protocol available. This reduces ASIC circuit flexibility.

SUMMARY OF THE INVENTION

It is the object of the present invention to solve the above drawbacks and provide a transport interface for time division frames, in particular SDH frames, and/or an interfacing method of time division frames, having a more efficient and improved performance with respect to existing solutions.

In this framework, it is the main object of the present invention to provide a transport interface for time division frames, in particular SDH frames, which has a lower complexity with respect to existing solution.

A further object of the present invention is to provide a transport interface for time division frames, in particular SDH frames, which is flexible and can be utilized by any circuits implementing various termination functions.

In order to achieve such objects, it is the subject of the present invention to provide a transport interface for time division frames, in particular SDH frames, and/or an interfacing method of time division frames, incorporating the features of the annexed claims, which form an integral part of the description herein.

It is a particular subject of the present invention a transport interface for time division frames, in particular SDH frames, being transmitted between network nodes according to a specified transport protocol, said nodes comprising first circuit means for processing said time division frames according to said specified transport protocol, and second circuit means for exchanging second information streams with said first circuit means through said transport interface, wherein said transport interface provides for structuring said second information streams as a data stream, sent in a co-directional way, and an address information.

It is a further particular subject of the present invention a method for interfacing time division frames, in particular SDH frames, which provides for extraction and exchange of the data streams multiplexed in said time division frames between a time division frame processing circuit and devices for processing the data streams contained in said time division frames, wherein it provides for the step of allocating a data stream and an address information, for co-directional information exchange between the time division frame processing circuit and the processing devices.

BRIEF DESCRIPTION OF THE DRAWINGS

Further objects, features and advantages of the present invention will become apparent from the following detailed description and annexed drawings, which are supplied by way of non limiting example, wherein.

BEST MODE FOR CARRYING OUT THE INVENTION

Figure 1:
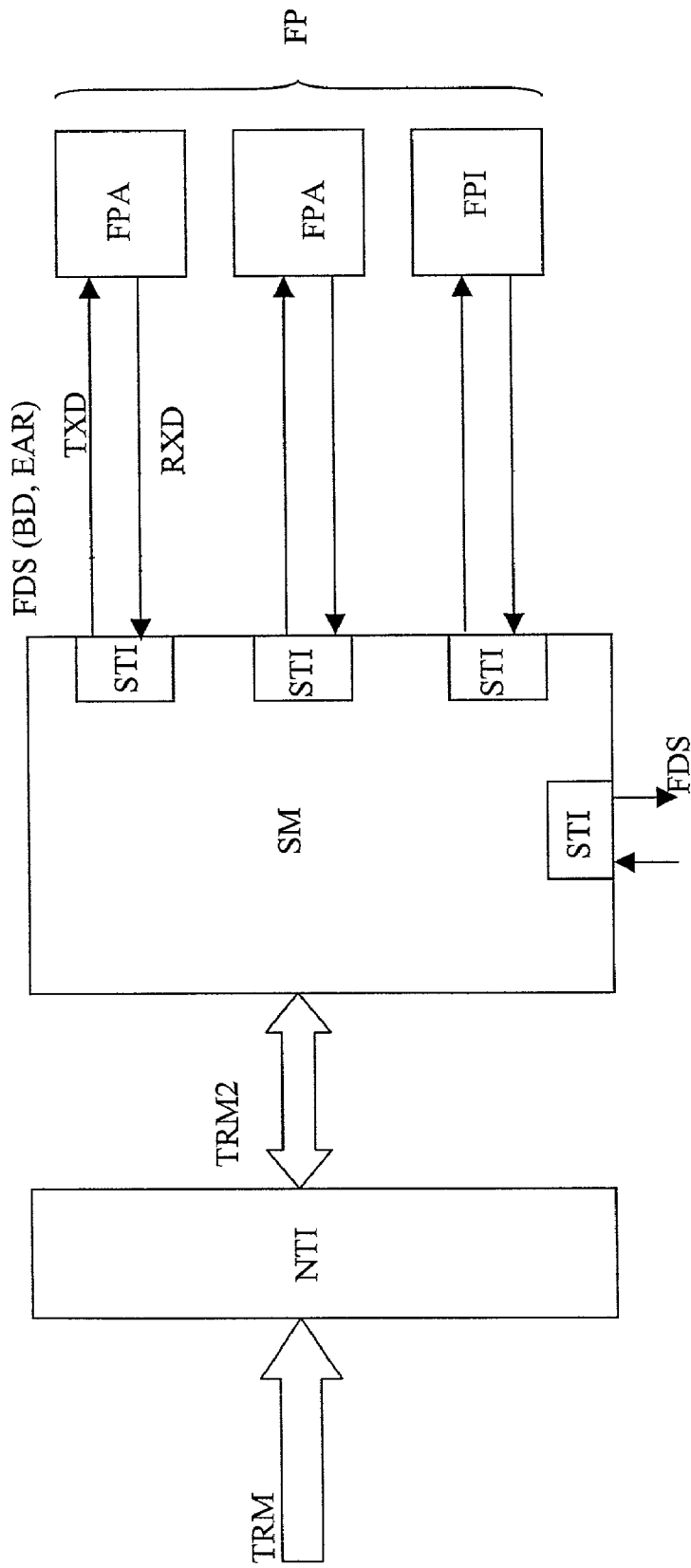
FIG. 1 shows a block diagram of a transport interface for time division frames, in particular SDH frames, according to the present invention.

FIG. 1 is representing a basic diagram of the architecture of a telecommunications network, wherein the transport interface according to the present invention is operating.

This figure shows a time division frames stream TRM structured according to the SDH protocol, said frames stream TRM being received by a network interface of the node NT1 that transmits to the main board of a switch matrix SM, sending a frames stream TRM2 adapted for said switch matrix SM. This switch matrix SM is obtained through an ASIC circuit and extracts for instance the tributaries from the frames stream TRM and processes their addresses.

The switch matrix SM communicates with a plurality of devices for processing the tributaries FP, external to the ASIC circuit and implemented by FPGA circuits, which perform the processing of the tributaries extracted from the switch matrix SM. In the instance of FIG. 1, there are indicated by way of example two devices FPA for processing the tributaries according to the ATM protocol and a device FPI for processing the tributaries according to the Internet Protocol.

According to the present invention, the switch matrix SM is equipped with appropriate transport interfaces STI, which exchange a special data stream FDS with the devices for processing the tributaries FP. Said special data stream FDS, the structure of which will be better detailed with reference to FIG. 2, comprises anyway a transmitted stream TXD, received by the device FP, and a received stream RXD, transmitted by the device FP and requested by the transport interface STI.

The basic inventive idea of the transport interface STI consists in that a data stream FDS contains a data bus BD, sent in a co-directional mode in both directions, wherein the information contents of the tributary to be processed is conveyed, and a minimum set of signals, i.e. an auxiliary signal EAR accompanying the data bus BD, comprising enable information and identifying information of the payload, i.e. an address of the tributary or port wherefrom it is extracted.

Thus, the device for processing the tributaries FP is only receiving data, information about the validity of said data through the enable information, and address information to allocate the tributary inside it. Vice-versa, the transport interface STI according to the present invention will receive the data bus BD from the device for processing the tributaries FP sending the auxiliary signal EAR in the form of a request, i.e. the address information identifies the tributary requested by the transport interface STI, whereas the enable information will act as a request to send the payload.

Figure 2:
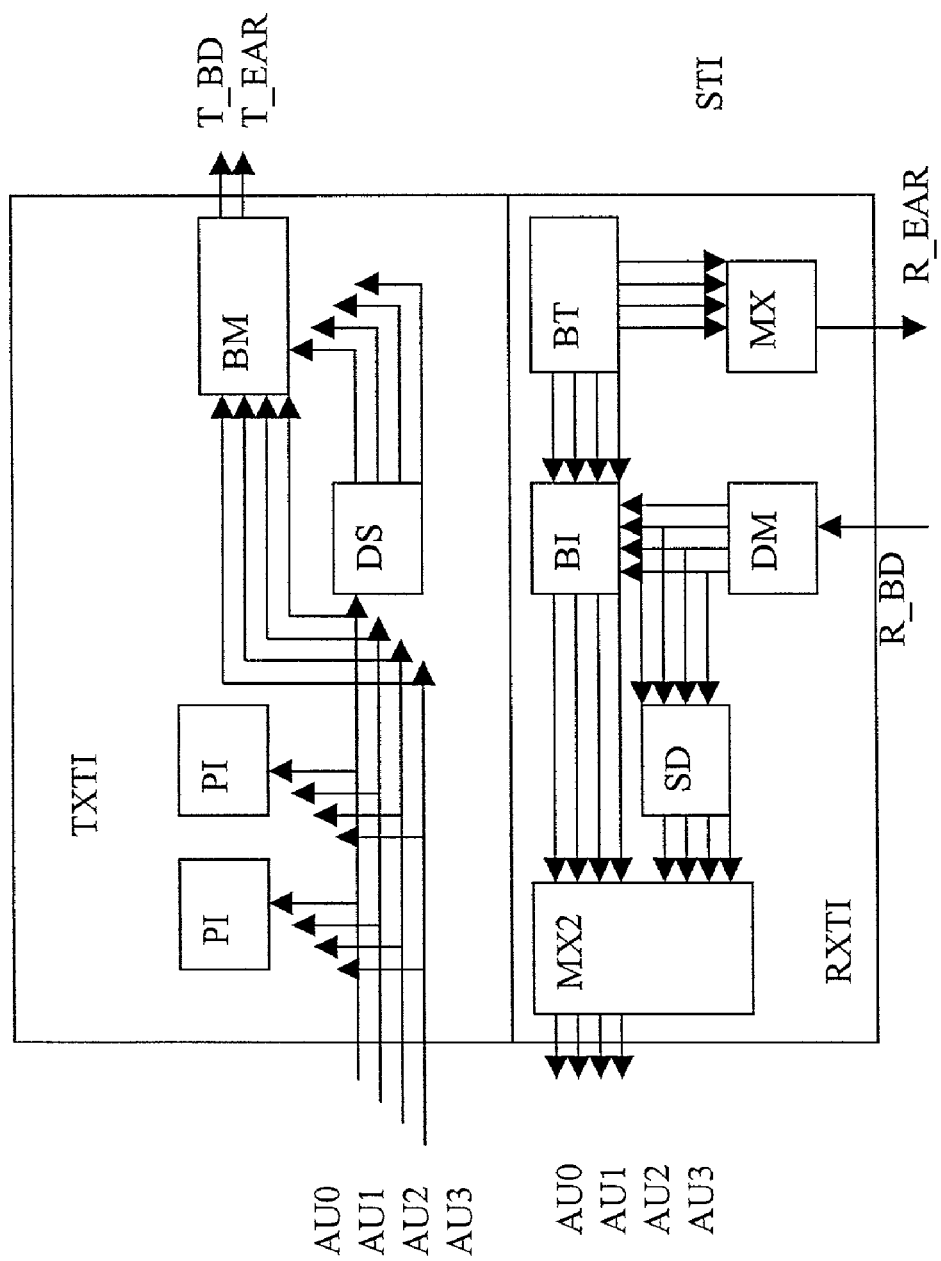
FIG. 2 shows a more detailed block diagram of the transport interface for time division frames, in particular SDH frames, of FIG. 1.

In FIG. 2 the transport interface STI of the switch matrix SM is shown, consisting of a receiver RXTI and transmitter TXTI. The transmitter TXTI receives at its input a plurality of Arbitrary Units AU0, AU1, AU2, AU3, which have been extracted inside the switch matrix SM from a frame TRM, and containing Tributary Unit tributaries, whose payload has to be sent in the transmitted stream TXD to the transport interface STI of the device for processing the tributaries FP.

As shown in FIG. 2, according to known demapping procedures the pointers related to the AU and TU structures are taken out of the four Arbitrary Units AU0, AU1, AU2, AU3 through appropriate logic circuits PI, called Pointer Interpreters, and the Arbitrary Units are multiplexed at a quadruple frequency in a data bus T_BD by a suitable multiplexer BM also generating an auxiliary signal T_EAR.

FIG. 2 also shows a desynchronizing circuit DS, which according to known techniques drives the multiplexer BM to generate plesiochronous streams (no longer synchronous as inside the switch matrix SM).

The receiver RXTI receives the transmitted data over a data bus R_BD and demultiplexes them at a lower frequency, through a demultiplexer DM, to a first insertion block BI controlled by a time base BT, which also controls the generation through a multiplexer MX of an auxiliary signal R_EAR, which requests the data to be mapped in the Virtual Containers of the frames TRM from the device for processing the tributaries FP. A synchronizing circuit SD is also provided, which controls, according to known mapping techniques, the flow of the data streams from the plesiochronous edge, represented by the data bus R_BD outside the transport interface STI, to the synchronous edge in the switch matrix SM. The synchronizing circuit SD supplies the timing to a multiplexer MX2, which receives the demultiplexed data streams from the insertion block BI and inserts them in the Arbitrary Units A0, A1, A2, A3, to be subsequently multiplexed.

The signal in the data bus BD, either received or transmitted by the interface STI, is an 8-bit signal either containing the payload of the tributary element extracted from the Virtual Container, in the case it belongs to the transmitted stream TXD, i.e. it is the data bus T_BD, or containing the payload to be inserted in a Virtual Container in the case it belongs to the received stream RXD, i.e. the data bus R_BD.

As explained above, the interface STI generates the auxiliary signal EAR, which corresponds to the above minimum set of signals required for the handling of the data bus BD by the device for processing the tributaries FP.

The auxiliary signal T_EAR is actually a 9-bit signal: the bits 0 to 5 contain an address information of the tributaries being extracted, the bits 6 and 7 contain information about the Arbitrary Unit AU being extracted, the bit 8 is an enable bit, i.e. if it is at logic one, the data is valid for the receiver of the transport interface STI. The data bus T_DB and the auxiliary signal T_EAR form the transmitted stream TXD, which is received exactly from the device for processing the tributaries FP.

The received stream RXD, flowing from the processing device FP to the switch matrix SM, is substantially sent in reply to a data request signal issued by the transport interface STI, as mentioned above. In this case, it is the auxiliary signal R_EAR, wherein also the first 6 bits (0 to 5) contain information about the requested tributaries, bits 6 and 7 contain information about the requested Arbitrary Unit AU, whereas the bit 8 is a request enable bit.

The tributaries processing device transmits the requested tributary to the data bus R_BD through the auxiliary signal R_EAR, to be mapped into an SDH Virtual Container by means of the switch matrix SM receiving it.

Consequently, if the transport interface STI requests to insert a payload (which will be transmitted to it through the data bus R_BD) in the tributary 0, AU=0, the auxiliary signal R_EAR will substantially have the following binary contents: R_EAR(8:0)="1"&"00"& "00000"

According to a feature of the present invention, the device for processing the tributaries FP supplies the data to be inserted, conveyed in the data bus BD, with a delay with respect to the auxiliary signal EAR. This delay can be set at a predetermined number of clock intervals, which can be reset, as per FPGA circuit requirements. In the event of a 77 MHz operating frequency, this delay is 7 clock shots.

The signals described in the above examples have a minimum configuration and are suitable for general protocols, such as Internet Protocol. In the event of tributaries exchange with the tributaries processing device FPA, operating according to the Asynchronous Transfer Mode protocol, a 1-bit synchronism signal, utilized by the tributaries processing device FPA for marking the start of the ATM cells, as well as an alarm bit TSF for the device for processing tributaries FPA, can be sent into the transmitted stream TXD, besides the auxiliary signal T_EAR. In this event, additional pins for these signals can be provided.

This synchronism signal can be alternatively used for marking a particular bit of the transport protocol or of the payload, such as in the case of Gbit Ethernet.

In the event of ATM protocol, the received stream RXD will equally contain in addition a synchronism bit, for the switch matrix SM, pointing to the correct bit of payload start, or a specific byte for the correct mapping in the ASIC.

From the above description the features of the present invention are clear, and also its advantages are clear.

The transport interface for time division frames, in particular SDH frames according to the present invention will advantageously make intra-equipment communication easier between the switch matrix or other central circuits for time division frames, and the peripheral frame processing devices. This will also simplify the control logic requested for processing information streams, i.e. reducing interface complexity.

Moreover, the transport interface for time division frames, in particular SDH frames according to the present invention will advantageously increase ASIC circuit flexibility when in use with FPGA circuits; also in the case of the circuit having dedicated interfaces for special protocols, it can always be equipped with a transport interface covered by the present invention, so as to be able to take tributaries at any time according to a simple adaptable protocol and increase its flexibility.

There has thus been shown and described a novel transport interface for time division frames, in particular SDH frames, and a novel interfacing method of time division frames, which fulfill all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

In particular, the time division data frames on which the interface according to the present invention operates may have different formats.

What is claimed is:

1. A transport interface for time division frames, being transmitted between network nodes according to a specified transport protocol, each of said nodes comprising:
   first circuit means for processing said time division frames according to said specified transport protocol, and
   second circuit means for exchanging second information streams with said first circuit means through said transport interface to receive a request from the first circuit means and return to the first circuit means data originated from the second circuit means in response to the request,
   wherein the transport interface comprises circuitry for structuring said second information streams as a data stream sent bi-directionally, and an address information.

2. The transport interface for time division frames, according to claim 1, wherein the address information comprises enabling information for the exchange of the second information streams.

3. The transport interface for time division frames according to claim 2, wherein it provides a reciprocal time delay between the transmission of the data stream and the transmission of the address information.

4. The transport interface for time division frames according to claim 3, wherein the transport interface comprises a transmitter for sending a data stream, extracted from the time division frame, and first address information.

5. The transport interface for time division frames according to claim 3, wherein the transport interface comprises a receiver for receiving a data stream originated by the second circuit means and for sending second address information to said second circuit means.

6. The transport interface for time division frames according to claim 4, wherein said first address information comprises a first transmission enabling information and one or more address information of the transmitted data stream.

7. The transport interface for time division frames according to claim 5, wherein said second address information comprises second transmission enable information for the second circuit means and one or more address information of the data stream requested from said second circuit means.

8. The transport interface for time division frames according to claim 6, wherein said first address information, comprises a synchronism signal utilized by said second circuit means for marking the start of ATM cells and/or an alarm bit TSF for the second circuit means.

9. The transport interface for time division frames according to claim 7, wherein said second address information, comprises a synchronism signal for the first circuit means for marking the correct bit of payload start for a correct handling in the first circuit means of the information transported by the payload.

10. The transport interface for time division frames according to claim 1, wherein the first circuit means comprises an ASIC circuit, and the second circuit means comprises FPGA circuits.

11. A method for interfacing time division frames, telecommunications network that provides for extraction and exchange of the data streams multiplexed in said time division frames between a time division frame processing circuit and devices for processing the data streams contained in said time division frames, the method comprising:
   allocating a data stream and an address information for bi-directional information exchange between the time division frame processing circuit and the devices for processing the data streams; and
   returning to the time division frame processing circuit data originated from the devices for processing the data streams in response to a request from the time division frame processing circuit.

* * * * *